United States Patent [19]

Bagheri et al.

[11] Patent Number: 6,043,401
[45] Date of Patent: Mar. 28, 2000

[54] REACTIVE, LOW MOLECULAR WEIGHT, VISCOUS POLY(1-OLEFINS) AND COPOLY (1-OLEFINS) AND THEIR METHOD OF MANUFACTURE

[75] Inventors: Vahid Bagheri, Lisle; Bruce Edward Firth, Buffalo Grove; Frank Calabrese, Streamwood; Robert Scott Hensey, West Chicago, all of Ill.

[73] Assignee: BP Amoco Corporation, Chicago, Ill.

[21] Appl. No.: 09/007,591

[22] Filed: Jan. 15, 1998

Related U.S. Application Data

[62] Continuation of application No. 08/576,573, Dec. 21, 1995, abandoned, which is a continuation of application No. 08/211,925, filed as application No. PCT/US93/04991, May 26, 1993, abandoned, which is a continuation-in-part of application No. 07/889,045, May 26, 1992, abandoned.

[51] Int. Cl.[7] ........................................................ C10L 1/16
[52] U.S. Cl. .................. 585/12; 585/7; 585/10; 585/520; 585/522; 585/523; 585/524; 585/525; 585/526; 585/527; 585/528; 585/529; 585/530; 585/531; 585/532; 585/533; 526/160; 526/165; 526/348.5; 526/348.6
[58] Field of Search ...................... 526/160, 165, 526/348.5, 348.6; 585/7, 10, 12, 520, 522, 523, 524, 525, 526, 527, 528, 529, 530, 531, 532, 533

[56] References Cited

U.S. PATENT DOCUMENTS

| | | |
|---|---|---|
| 3,705,884 | 12/1972 | Frese . |
| 4,238,628 | 12/1980 | Cahill et al. . |
| 4,530,914 | 7/1985 | Ewen et al. .............................. 502/113 |
| 4,542,199 | 9/1985 | Kaminsky et al. ...................... 526/160 |
| 4,658,078 | 4/1987 | Slaugh et al. ........................... 585/512 |
| 4,704,491 | 11/1987 | Tsutsui et al. ............................ 585/10 |
| 4,752,597 | 6/1988 | Turner .................................... 502/104 |
| 4,808,561 | 2/1989 | Welborn, Jr. ............................ 502/104 |
| 5,001,244 | 3/1991 | Welborn, Jr. ............................ 502/104 |
| 5,017,299 | 5/1991 | Gutierrez et al. . |
| 5,017,665 | 5/1991 | Chang ..................................... 526/129 |
| 5,068,490 | 11/1991 | Eaton ...................................... 585/525 |
| 5,077,255 | 12/1991 | Welborn, Jr. ............................ 501/104 |
| 5,151,204 | 9/1992 | Struglinski ................................ 252/52 |
| 5,162,466 | 11/1992 | Karol et al. ............................. 526/132 |
| 5,225,091 | 7/1993 | Gutierrez et al. . |
| 5,225,092 | 7/1993 | Emert et al. . |
| 5,229,022 | 7/1993 | Song et al. . |
| 5,274,182 | 12/1993 | Weider et al. .......................... 560/347 |
| 5,321,189 | 6/1994 | Mueller et al. ......................... 585/512 |

FOREIGN PATENT DOCUMENTS

| | | |
|---|---|---|
| 2024121 | 3/1991 | Canada . |
| 0268214 | of 0000 | European Pat. Off. . |
| 0352935 | of 0000 | European Pat. Off. . |
| 0490454 | of 0000 | European Pat. Off. . |
| 0607703 | of 0000 | European Pat. Off. . |
| 0252372 | 1/1988 | European Pat. Off. . |
| 0294942 | 12/1988 | European Pat. Off. . |
| 0295026 | 12/1988 | European Pat. Off. . |
| 0355895 | 2/1990 | European Pat. Off. . |
| 0457599 | 11/1991 | European Pat. Off. . |
| 0487278 | 5/1992 | European Pat. Off. . |
| 1132605 | of 0000 | Japan . |
| 2087907 | of 0000 | United Kingdom . |
| 9111488 | of 0000 | WIPO . |
| 9005711 | 5/1990 | WIPO . |

OTHER PUBLICATIONS

W. Kaminsky, et al., *Bull. Soc. Chim.*, Belg. 99(2), pp. 103–111 (1990) no month available.

"Polymerization of Propene and Butene With A Chiral Zirconocene and Methylaluminoxane as Cocatalyst," W. Kaminsky, et al., *Angew. Chem. Int. Ed. Engl.*, 24, No. 6, pp. 507–508 (1985) no month available.

Reisconi, et al., *J. Am. Chem. Soc.*, 114, pp. 1025–1032 (1992) no month available.

"Metallocenes: Catalyst For The New Polyolefin Generation", SRI International, vol. 111, Company Pat. Reviews. Jul. 1993.

Chem. Abstracts, vol. 111, No. 16, Oct. 16, 1989 (Abstract No. 134952f).

*Primary Examiner*—Elizabeth D. Wood
*Attorney, Agent, or Firm*—Mary Jo Kanady; Wallace L. Oliver

[57] ABSTRACT

Catalysts and processes are described to make low molecular weight, essentially terminally-unsaturated, viscous poly (1-olefin) or copoly(1-olefin) having a high terminal vinylidine content from a feed stock containing one or more 1-olefin and other volatile hydrocarbon liquids using a Ziegler catalyst made from a Group IVb metallocene and an aluminoxane cocatalyst, particularly bis(cyclopentadienyl) and bis(indenyl) titanium(IV), zirconium(IV) or hafnium (IV) compounds and methylaluminoxane. A particularly useful feed stock is a refinery stream containing 1-olefins and isobutylene which is used to make polyisobutylene. The reactive, essentially terminally-unsaturated, viscous poly(1-olefin) or copoly(1-olefin) can be functionalized to make a number of products useful as sealants, petroleum additives, adhesives, and the like by reacting the terminal vinylidine linkage with an aromatic, an epoxidation agent, a silylation agent, maleic anhydride, carbon monoxide and hydrogen, hydrogen, a halogen, a hydrohalogen, and the like.

30 Claims, No Drawings

REACTIVE, LOW MOLECULAR WEIGHT, VISCOUS POLY(1-OLEFINS) AND COPOLY (1-OLEFINS) AND THEIR METHOD OF MANUFACTURE

CROSS-REFERENCE TO RELATED APPLICATION

This application is a continuation of application Ser. No. 08/576,573 filed Dec. 21, 1995, now abandoned, which is a continuation of application Ser. No. 08/211,925 filed Apr. 28, 1994, now abandoned, which is a 371 of PCT/US93/04991 filed May 26, 1993, which is a continuation-in-part of application Ser. No. 07/889,045 filed May 26, 1992, now abandoned.

BACKGROUND OF THE INVENTION

This invention relates to the catalyzed preparation and reactions of a reactive, low molecular weight, viscous, essentially-1-olefin-containing poly(1-olefin) or copoly(1-olefin) prepared employing a catalyst comprising a Periodic Group IVb metallocene and an aluminoxane, and more particularly to the catalyzed preparation and reactions of a reactive, low molecular weight, viscous essentially-1-olefin-containing poly(1-olefin) or copoly(1-olefin) prepared from a feed stock containing one or more $C_3$ to $C_{20}$ 1-olefin and other volatile hydrocarbon liquids. The viscous polymers of this invention are essentially terminally-unsaturated poly(1-olefin)s or copoly(1-olefin)s with such terminal unsaturation being more than 80% vinylidene type made by a catalyst system using a Periodic Group IVb metallocene and an aluminoxane.

A number of patents and other publications have described the use of transition element, including those of Periodic Group IVb, metallocene/aluminoxane catalysts (supported or unsupported) for the polymerization of 1-olefins and certain cycloalkenes such as ethylene, propylene, butene1, hexene-1, octene-1, styrene, cyclobutene, cyclopentene, and norbornene. The catalysts are said to have advantages which include increased polymerization activity, the ability to produce some terminal unsaturation and a narrow molecular weight distribution in the product polymer, and the ability to precisely choose polymer stereo regularity. See U.S. Pat. Nos. 4,530,914; 4,752,597; 4,808,561; and 5,001,244. See also U.S. Pat. No. 4,542,199 where polymerization of olefins of formula $CH_2CHR$ in which R is H or $C_1$ to $C_{10}$ alkyl is described, the Periodic Group IVb metallocene employed is a bis (cyclopentadienyl) transition element particularly zirconium, and copolymerization with alpha-omega dienes is taught. In Example 4 of that patent, bis(cyclopentadienyl) zirconium dichloride and aluminoxane are used to give atactic polypropylene of molecular weight 5000.

Typically, a high ratio of methylaluminoxane(MAO) cocatalyst to metallocene must be used (approximately 300/1 or more). But see U.S. Pat. No. 4,808,561 wherein the reaction product of a mixture of metallocene and aluminoxane in the presence of a support is said to produce a catalyst which will polymerize olefins at an acceptable rate without the presence of an objectional excess of aluminum.

Also, see U.S. Pat. No. 4,752,597 which describes the use of a solid reaction product of a transition metal metallocene, particularly a Group IVb metallocene, with aluminoxane cocatalyst to effectively polymerize olefin wherein the molar ratio of metallocene to aluminoxane lies between 1:12 and 1:100. It has also been reported in U.S. Pat. No. 5,001,244 that the addition of a boron compound such as tris (perfluorophenyl)boron is able to reduce or eliminate the need for such a high aluminum to metallocene ratio.

In U.S. Pat. No. 5,162,466, use of a cyclo(pentadienyl) dicarbollide complexes of titanium, zirconium and hafnium as catalyst in the absence of a cocatalyst, such as an aluminoxane, is taught for polymerization of ethylene or copolymerization of ethylene with a $C_3$ to $C_8$ alpha olefin.

Stanford Research Institute reports that the use of one of these metallocene Ziegler catalysts to make polyethylene is being commercialized and the process is described as capable of preparing linear low density polyethylenes of superior physical properties.

It is reported by W. Kaminsky et al. in Bull. Soc. Chim. Belg. 99 (2),103–111(1990) that simple zirconium metallocenes polymerize propylene to atactic polymer. The reference also shows that chiral, ethylene-bridged bis (tetrahydroindenyl)zirconium dichloride and methylaluminoxane catalyst can produce isotactic polypropylene.

See also *Polymerization of Propene and Butene with a Chiral Zirconocene and Methylalumoxane as Cocatalyst* by W. Kaminsky et al. in Angew. Chem. Int. Ed. Engl. 2 4 No. 6, pp 507–508 (1985). Reisconi et al. in J. Am. Chem. Soc. 114 1025–1032(1992) states that polymerization of propylene with a bis(indenyl)zirconium dichloride ($Ind_2ZrCl_2$) and MAO catalyst leads to termination by beta hydrogen elimination and thus a polypropylene product which has some terminal unsaturation of the vinylidene type. In WO 9111488 to Exxon, a copolymeric wax crystal modifier of number average molecular weight between 300 and 15,000 made from ethylene and at least one alpha-olefin and containing at least 40 mol % ethylene is made using a metallocene catalyst. The copolymer has at least 30% of the polymer chains exhibiting terminal ethenylidine unsaturation.

In U.S. Pat. No. 4,658,078 use of (a) cyclo(pentadienyl) zirconium or hafnium metallocene and (b) an aluminoxane catalyst, with atom ratio of Al to Zr or Hf of 1 to 100, is taught for dimerizing a $C_3$ to $C_{32}$ alpha olefin at temperatures between −60° C. and 280° C.

In U.S. Pat. No. 4,704,491 copolymerizing ethylene and a $C_3$ to $C_{20}$ alpha-olefin in the presence of a compound of Periodic Group IVb and an aluminoxane catalyst is taught for making a random copolymer.

In U.S. Pat. No. 5,017,665, use of a supported, bridged bis(indenyl)zirconium dichloride/aluminoxane catalyst is taught for the copolymerization of a mixture of ethylene and 1,4-diene.

In U.S. Pat. No. 5,077,255, copolymerizing ethylene and a $C_3$ to $C_{20}$ alpha-olefin in the presence of a compound of Periodic Group IVb and an aluminoxane catalyst is taught for making a random copolymer having a number average molecular weight above 20,000 and an average of at least 30% of the polymer chains contain terminal ethylidene unsaturation.

In U.S. Pat. No. 5,151,204, use of a supported reaction product of (a) at least one metallocene of a metal of Group IVb, Vb, and VIb, (b) a non-metallocene transition metal containing compound of a Group IVb, Vb, and VIb metal and (c) an aluminoxane catalyst is taught for the copolymerization of a mixture of ethylene and other mono and diolefins.

In Japanese Patent No. 01,132,605 it is reported that a poly(1-olefin) made with bis(cyclopentadienyl)zirconium dichloride and methylaluminoxane can be reacted with perbenzoic acid to form epoxide.

In European Patent Application No. 0 268 214, it is reported that propylene oligomers were made with an alkyl substituted cyclopentadienyl compound of zirconium and/or hafnium and a condensation product of organoaluminum compound and water. In Comparative Examples 1, 2, and 3, however, using three non-substituted cyclopentadienyl compounds, i.e., bis(cyclopentadienyl)zirconium, hafnium, and titanium dichloride, a polymerization of propylene reaction took place preferentially to propylene oliogomerization reaction and products were all high polymers which predominantly had vinylidene group as terminal unsaturated group.

Terminal unsaturation of the vinylidene type can be very important to polymer reactivity in the case of low molecular weight, viscous polybutenes when being functionalized and a number of ways to enhance it have been suggested. For example, use of a $BF_3$ catalyst can substantially reduce the amount of tri- and tetra-substituted terminal olefin in the polymerization and produce more vinylidene type of termination. Terminal unsaturation of the proper type could also be very helpful to the reactivity of poly(1-olefins).

Now it has been found that a low molecular weight, viscous essentially-1-olefin-containing poly(1-olefin) or copoly(1-olefin) can be formed from a feed stock containing one or more $C_3$ to $C_{20}$ 1-olefin and other volatile hydrocarbons by selectively polymerizing the 1-olefins with a Ziegler type metallocene and aluminoxane catalyst. Furthermore, viscous poly(1-olefins) and copoly(1-olefins) so formed are almost completely terminally unsaturated and their terminal unsaturation is, advantageously, largely of the vinylidene type. Such viscous polymers are very reactive because of the presence of the high degree of unsaturation and the extensive vinylidene termination and therefore can be easily functionalized in high yields by conventional methods to make a range of useful products. Products and process are described here in which the terminal olefinic linkage, for example, has been used to alkylate an aromatic ring, or has undergone an Ene reaction, an addition, a hydroformylation, a hydrosilylation, a chlorination, and the like. The lack of polymerization activity of these catalysts towards olefins other than 1-olefins allows a common refinery streams containing a mixture of olefins including isobutylene to be effectively polymerized to make polyisobutene by the usual acid catalyzed process as well as produce the low molecular weight, viscous poly(1-olefin) or copoly(1-olefin) of this invention. This multistep procedure involves a different catalyst for each polymerization and utilizes more fully the components of the refinery stream which after polyisobutylene formation is customarily used for fuel.

SUMMARY OF THE INVENTION

The invention contained herein is a process to form an essentially terminally-unsaturated, viscous, essentially-1-olefin-containing poly(1-olefin) or copoly(1-olefin) of molecular weight between about 300 and about 10,000 that exhibits a terminal vinylidene content of more than 80% which comprises polymerizing a feed comprising one or more $C_3$ to $C_{20}$ 1-olefin using a catalyst comprising a Periodic Group IVb metallocene and aluminoxane cocatalyst, said mixture containing at least about 1 wt. % isobutylene.

In another aspect, the invention is a process to form an essentially terminally-unsaturated, viscous, essentially-1-olefin-containing poly(1-olefin) or copoly(1-olefin) which process comprises polymerizing under fluid phase conditions, preferably liquid phase conditions, a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form a poly(1-olefin) or copoly(1-olefin) having molecular weight in a range from about 300 to about 10,000 and terminal vinylidene content of more than 80%. In practice of this invention catalyst systems using a bis(cyclopentadienyl) or bis(indenyl) titanium(IV), zirconium(IV) and hafnium(IV) compound are particularly useful, preferably, bis(cyclopentadienyl)zirconium dichloride and bis(indenyl)-zirconium dichloride. Advantageously, the cocatalyst is a linear methylaluminoxane and/or cyclic methylaluminoxane.

In one embodiment of the process of this invention the feed stock contains at least about 0.1 wt. % of isobutylene, the catalyst system comprises bis(indenyl)zirconium dichloride and methylaluminoxane cocatalyst, and wherein a poly (1-olefin) or copoly(1-olefin) having molecular weight is a range from about 300 to about 5000, terminal vinylidene content is greater than 90% is formed.

In a further embodiment of the process of this invention the feed stock additionally contains up to about 70% by weight of an alpha-omega diene.

In another aspect, the invention is an essentially terminally-unsaturated, viscous, essentially-1-olefin containing poly(1-olefin) or copoly(1-olefin) polymer having molecular weight in a range from about 300 to about 10,000 and terminal vinylidene content of more than 80%, which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst.

In preferred embodiments the polymers of this invention are formed by a catalyst system using bis(cyclopentadienyl) zirconium dichloride and/or bis(indenyl)zirconium dichloride and a linear methylaluminoxane and/or cyclic methylaluminoxane cocatalyst.

In a further aspect, the invention is process to sequentially from polyisobutylene and an essentially terminally-unsaturated, viscous, essentially-1-olefin-containing poly(1-olefin) or copoly(1-olefin) of molecular weight between about 300 and about 10,000 that exhibits a terminal vinylidene content of more than 80% from a feed stock comprising more than 1 weight percent of at least one volatile hydrocarbon liquid and less than 99 weight percent based on total feed stock of one or more $C_3$ to $C_{20}$ 1-olefin, the feed containing between about 0.1 and 55 wt. % isobutylene which process comprises the steps:

(a) polymerizing the 1-olefin using a catalyst system comprising a titanium(IV), zirconium(IV) or hafnium (IV) metallocene and aluminoxane cocatalyst to form poly(1-olefin) or copoly(1-olefin); and (b) polymerizing the isobutylene with an acid catalyst to form polyisobutylene.

In another aspect, the invention is a product formed by reaction of phenol or substituted phenol with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form a largely para-alkylated product of reaction. Preferred products of this reaction are formed using a catalyst system of bis(cyclopentadienyl)zirconium dichloride and/or bis(indenyl)zirconium dichloride, and a linear methylaluminoxane and/or cyclic methylalumninoxane cocatalyst. Preferred products of this reaction are also formed using feed stock containing isobutylene in an amount of from about 0.1 weight percent to about 55 weight percent isobutylene based on total weight of feed stock.

In another aspect, the invention is a product formed by reaction of hydrogen peroxide or a peracid with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising bis(indenyl)zirconium (IV) dichloride and an aluminoxane cocatalyst to form the corresponding epoxide product of reaction. Preferred products of this reaction are formed using a catalyst system of bis(cyclopentadienyl)zirconium dichloride and/or bis (indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In yet another aspect, the invention is a product formed by reaction of a silylating agent containing at least one silicon-hydrogen bond with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form the corresponding terminally silylated poly(1-olefin) or copoly(1-olefin) product of reaction. Preferred products of this reaction are formed using a catalyst system of bis(cyclopentadienyl)zirconium dichloride and/or bis(indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In a further aspect, the invention is a product formed by reaction of maleic anhyride with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form the corresponding succinic anhydride product of reaction. Preferred products of this reaction are formed using a catalyst system of bis(cyclopentadienyl)zirconium dichloride and/or bis(indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In still a further aspect, the invention is a product formed by reaction of carbon monoxide and hydrogen with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(V) or hafnium(IV) metallocene and an aluminoxane cocatalyst to form the corresponding alcohol product of reaction. Preferred products of this reaction are formed using a catalyst system of bis(cyclopentadienyl)zirconium dichloride and/or bis(indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In a further aspect, the invention is a product formed by reaction of hydrogen with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form a largely saturated product of reaction. Preferred products of this reaction are formed using a catalyst system of bis(cyclopentadienyl)zirconium dichloride and/or bis (indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In another aspect, the invention is a product formed by reaction of aliphatic diamine with chlorinated polymer formed by reaction of chlorine with essentially terminally-unsaturated, viscous, essentially-1-olefin-containing poly(1-olefin) or copoly(1-olefin) having molecular weight in a range from about 300 to about 10,000 and terminal vinylidene content of more than 80% which poly(1-olefin) or copoly(1-olefin) is made from a feed stock comprising more than 1 weight percent of at least one volatile hydrocarbon liquid and less than 99 weight percent based on total feed stock of one or more $C_3$ to $C_{20}$ 1-olefin using a catalyst system comprising a titanium(IV), zirconium(IV) or hafnium(IV) metallocene and an aluminoxane cocatalyst to form an aminated product of reaction. Preferred products of this reaction are formed using a catalyst system of bis(cyclopentadienyl)zirconium dichloride and/or bis(indenyl)zirconium dichloride, and a linear methylaluminoxane and/or cyclic methylaluminoxane cocatalyst. Preferred products of this reaction are also formed using feed stock containing isobutylene in an amount of from about 0.1 weight percent to about 55 weight percent isobutylene based on total weight of feed stock.

In a further aspect, the invention is an essentially terminally-unsaturated, viscous, essentially-1-olefin-containing poly(1-olefin) or copoly(1-olefin) of molecular weight between about 300 and about 10,000 that exhibits a terminal vinylidene content of more than 80% which is made from a feed comprising one or more $C_3$ to $C_{20}$ 1-olefin using a catalyst comprising a Periodic Group IVb metallocene and an aluminoxane cocatalyst, said feed containing at least about 1 wt. % isobutylene. In still a further aspect, the invention is a process to form an essentially terminally-unsaturated, viscous, essentially-1-olefin-containing poly(1-olefin) or copoly(1-olefin) of molecular weight between about 300 and about 10,000 that exhibits a terminal vinylidene content of more than 80% comprising polymerizing a feed containing one or more olefin selected from the group consisting of $C_3$ to $C_{20}$ 1-olefins with a catalyst comprising a bis(indenyl)titanium(IV), zirconium(IV) or hafnium(IV) compound and an aluminoxane cocatalyst. In yet another aspect, the invention is the reaction of a phenol or substituted phenol, an epoxidation agent, a silylating agent having at least one silicon-hydrogen bond, maleic anhydride, or carbon monoxide and hydrogen (hydroformylation) with an essentially terminally-unsaturated, viscous, essentially-1-olefin-containing poly(1-olefin) or copoly(1-olefin) of molecular weight between about 300 and about 10,000 that exhibits a terminal vinylidene content of more than 80% which is made from a feed comprising one or more $C_3$ to $C_{20}$ 1-olefin using a catalyst comprising a titanium(IV), zirconium(IV) or hafnium(IV) metallocene and an aluminoxane cocatalyst to form the corresponding largely para-alkylated phenol or substituted phenol, epoxide, a terminally silylated poly(1-olefin) or copoly(1-olefin), succinic anhydride, alcohol, or saturated hydrocarbon. And in still another aspect, the invention is a process to sequentially form polyisobutylene and an essentially terminally-unsaturated, viscous, essentially-1-olefin-containing poly(1-olefin) or copoly(1-olefin) of molecular weight between about 300 and about 10,000 that exhibits a terminal vinylidene content of more than 80% from a feed comprising one or more $C_3$ to $C_{20}$ 1-olefins, said feed contains between about 0.1 and 55 wt. % isobutylene which comprises:

polymerizing said feed using a catalyst comprising a titanium(IV), zirconium(IV) or hafnium(IV) metallocene and an aluminoxane cocatalyst to form said poly(1-olefin) or copoly(1-olefin); and polymerizing said isobutylene with an acid catalyst to form said polyisobutylene.

DETAILED DESCRIPTION OF THE INVENTION

The Ziegler catalysts which are suitable for this invention are composed importantly of two components. One component is a Periodic Group IVb metallocene, preferably a titanium(IV), zirconium(IV) or hafnium(IV) metallocene and the other is an aluminoxane. The organic moiety of the metallocene is preferably cyclopentadienyl, indenyl or a lower alkyl derivative thereof such as a lower-alkyl-substituted cyclopentadienyl or indenyl. Examples are bis(pentamethylcyclopentadienyl) or an ethylene-bridged bis indenyl compound (at least with monomers that it does not give isotactic polymers with). The zirconium(IV) metallocenes are more preferred, as they give molecular weights in the 1000 to 2000 number average range in the convenient 30 to 80° C. range, and bis(indenyl)zirconium dichloride is the most preferred metallocene.

The aluminoxanes are made generally by careful hydrolysis of a trialkylaluminum, more preferably trimethylaluminum which makes methylaluminoxane, and may be the linear or cyclic variety of aluminoxane or a mixture of both. This type of Ziegler catalyst unlike the widely used titanium trichloride/aluminum alkyl catalyst for propylene polymerization is generally soluble in aromatic solvents such as benzene, toluene and the like as may be understood by one skilled in the art. The molar amount of aluminoxane used in the catalyst is generally considerably greater than that of the metallocene used. Generally, molar ratios of about 20 to about 300 (aluminoxane to metallocene) or more are used, although methods have been devised to reduce the amount of aluminoxane as maybe understood by one skilled in the art. For example, the catalyst may contain a boron compound such as tris(perfluorophenyl)boron which can be effective in reducing or eliminating the amount of aluminoxane needed.

Generally, the metallocene and aluminoxane are individually combined with the olefin to be polymerized, and the order of combination does not appear critically important. It is not necessary to combine the metallocene and aluminoxane first and isolate a solid which is then used as the catalyst by addition to the polymerization mix.

Feed stocks which are suitable for this invention are composed importantly of two components. One component is a one or more $C_3$ to $C_{20}$ 1-olefin, preferably $C_3$ to $C_{10}$ 1-olefin, more preferably one or more 1-olefin selected from the group consisting of propene, 1-butene, 1-pentene, and 1-hexene, and most preferably 1-butene, 1-pentene, and/or 1-hexene. The other essential component of such feed stocks is another hydrocarbon (non-1-olefin), preferably one or more volatile hydrocarbon liquid. Furthermore, feed stocks which are suitable for this invention are substantially free of nitrogen, sulfur, and oxygen containing compounds and like compounds which can deactivate the catalyst systems of this invention.

Advantageously, the volatile hydrocarbon liquid components of the feed stock are in the liquid phase at conditions of polymerization, but have sufficient volatility, relatively low normal boiling temperatures, such that these volatile hydrocarbon liquid can be separated from the essentially terminally-unsaturated, viscous, essentially-1-olefin-containing poly(1-olefin) or copoly(1-olefin) products having number average molecular weight in a range from about 300 to about 10,000, by a reduction of pressure at temperatures below about 250° C.

The olefin feed to make the low molecular weight, viscous polymers of this invention contains one or more $C_3$ to $C_{20}$ 1-olefin. A particularly preferred feed is a refinery stream sometimes referred to as a butane-butylene stream (BB stream) which contains substantial amounts of $C_4$ hydrocarbons such as isobutylene, 1-butene, 2-butene and butane together with propene, propane and small amounts of higher hydrocarbons. Such streams are used in the manufacture of poly(isobutylene). Other preferred feeds are a BB stream after the isobutylene content has been largely or completely polymerized by an acid catalyst such as aluminum chloride or boron trifluoride which is generally rich in propylene and 1-butene (lean BB), and raffinates I and II which are feeds derived from abeam cracking units typically containing between about 55 and 0.1 wt. % isobutylene. Propene and 1-butene and their mixtures are also preferred feeds to the process of this invention.

When the olefin feed contains isobutylene, it is present in an amount between about 0.1 wt. % and about 55 wt. %, more preferably between about 1 wt. % and 55 wt. %, and most preferably between about 5 wt. % and 55 wt. %.

Feed stocks which are suitable for this invention include a butane-butene feed stock having an approximate composition of 8% propane, 9% propene, 39% isobutane, 14% 1-butene, 12% n-butane, 2% isobutylene 15% cis and trans 2-butenes, 0.5% butadiene and small amounts (less than 1%) of other hydrocarbons). Other butane-butene feed stocks suitable for this invention include feed stocks having an approximate composition 4% isobutane, 28% 1-butene, 10% n-butane, 42% isobutylene, 16% cis and trans 2-butenes, and small amounts (less than 1%) of other hydrocarbons) and a butane-butene feed stock having an approximate composition 8% isobutane, 46% 1-butene, 17% n-butane, 27% cis and trans 2-butenes, and small amount (less than 1%) of other hydrocarbons). Other feed stocks which are suitable for this invention include pentane-pentene feed stocks varying in the relative amount of 1-pentene from 5% 1-pentene and 95% pentane to 50% 1-pentene and 50% pentane.

Copolymers made from one or more 1-olefin and a diene may be made. Preferably a diene with one double bond substituted by a R group (to suppress any cross linking by the added olefinic linkage) such as isoprene, 7-methyl-1,6-octadiene, 4-vinylcyclohexene, and the like may be used in the inventive process. The addition of up to about 70 wt. %, more preferably up to about 50 wt. % to the polymerization feed of such diene, more preferably an alpha-omega diene, allows non-terminal unsaturation to be included in the inventive polymers which can provide for cross linking and alteration of the polymer properties.

The terminally unsaturated, viscous polymer of this invention is essentially a poly(1-olefin) or copoly(1-olefin). By essentially is meant more than about a 95% and, more preferably, more than about a 98% 1-olefin content in the polymer chains except where, for example, an alpha-omega diene is added as described above. The catalyst of the invention appears to not substantially cause the polymerization of olefinic monomers other than 1-olefins. The product polymers also preferably have a number average molecular weight ($M_n$) between about 300 and about 10,000, more preferably between about 300 and about 5000, and most preferably about 400 and about 3000 when measured by gel permeation chromatography. The polymer chains of the viscous polymers of this invention are essentially terminally-unsaturated. By essentially terminally-unsaturated is meant preferably more than about 90% of the polymer chains contain unsaturation, more preferably more than about 95%, and most preferably more than about 99% of the polymer chains in the product polymer contain terminal unsaturation. The terminal unsaturation is preferably more than about 80%, more preferably more than about 90%, and, most preferably, more than about 95% of the vinylidene type.

The high degree of vinylidene type unsaturation makes the viscous polymers of this invention very reactive in the typical functionalization reactions which olefinic linkages undergo such as addition, hydroformylation, hydrosilylation, Ene reactions such as a Diels Alder, alkylation, and the like.

The temperature of polymerization is determined in part by the molecular weight of the polymer to be made. As may be understood by one skilled in the art, the molecular weight is in part determined by the temperature. However, the composition of the catalyst is also able to influence the molecular weight. Higher temperatures generally lead to lower molecular weights. A temperature in the range of about −80° C. to about 150° C. may be used depending upon the use to which the polymer product is to be put. More preferably, the polymerization temperature is about ambient to 100° C., most preferably between about 50 and 100° C. for convenience of the polymerization operation.

The inventive catalysts made from metallocene and aluminoxane cocatalyst can be used unsupported or supported by compositing them with a typical inorganic oxide support material used for this type of Ziegler catalyst as can be understood by one skilled in the art. The polymerization process utilizing the catalysts may be a suspension, solution or gas phase polymerization.

By viscous is meant polymers which undergo cold flow at molecular weights in the above set forth ranges at ambient temperature.

One of the more useful functionalization reactions on the polymers of this invention is the use of the viscous, terminally unsaturated poly(1-olefins) to alkylate an aromatic compound such as phenol or a substituted phenol. Viscous poly(1-propene) or poly(1-butene) made by a process of this invention when used to alkylate phenol gives preferentially the para-substituted alkylation product which has some special advantages as viscosity improves, and the like. The alkylated phenol product when reacted with materials such as formaldehyde and tetraethylenepentamine forms a useful lubricating oil dispersant such as the Mannich additive.

Another very useful functionalization reaction of the terminal vinylidene bond of the polymers of this invention is the reaction of a poly(1-olefin) with maleic anhydride (an Ene reaction) which terminates the polymer with a succinic anhydride. Such materials are useful for petroleum additives, paper sizing agents, adhesives, and the like.

Other useful functionalization reactions of the terminal vinylidene bond that produce compounds of great utility are hydroformylation with carbon monoxide and hydrogen, hydrosilylation with a silane such as a alkoxysilane or alkoxychlorosilane, epoxidation with hydrogen peroxide or a peracid, halogenation with chlorine or bromine, hydrohalogenation hydrogenation sulfonation with sulfonic acid, and the like. The formation of these products generally proceed in the manner in which simple 1-olefins do may be understood by one skilled in the art.

The low molecular weight, viscous, essentially terminally-unsaturated, essentially 1-olefin polymers and copolymers of this invention may be used for lubricating oils, gasoline additives, sealants, caulks, adhesives, cosmetics, oil field chemicals, and the like. They have distinct advantages over viscous polybutenes for one or more of these applications as they:

have higher reactivity due to the steric character of the terminal olefinic link;

have different viscosity/molecular weight relationships than current viscous polyolefins;

can have higher reactivity than current viscous polyolefins after being derivatized due to the steric character of the terminal olefin; and.

have potentially higher number average molecular weights which are larger than current viscous polyolefins.

The functionalized products made using a phenol or substituted phenol, maleic anhydride, an epoxidizing agent, a hydrosilylating agent or carbon monoxide and hydrogen, and the like, and of the low molecular weight, viscous, essentially-terminally unsaturated, essentially 1-olefin polymers and copolymers of this invention are also useful for lubricating oils, gasoline additives, sealants, caulks, adhesives, cosmetics, and the like.

Low molecular weight, viscous, essentially-terminally unsaturated, essentially 1-olefin polymers and copolymers of this invention may be chlorinated with any of a variety of reagents including elemental chlorine and the chlorinated product then reacted with any of a variety of amines, e.g. ethylene diamine, to obtain aminated product useful in fuel and motor oil compositions. See, for example, U.S. Pat. Nos. 3,960,515; 4,832,702; 4,234,235; and WO 92/14806 the disclosures of which are incorporated herein by reference.

The following Examples will serve to illustrate certain specific embodiments of the herein disclosed invention. These Examples should not, however, be construed as limiting the scope of the novel invention contained herein as there are many variations which may be made thereon without departing from the spirit of the disclosed invention, as those of skill in the art will recognize.

EXAMPLES

All manipulations with the metallocene and aluminoxane cocatalyst were carried out in a glove box under nitrogen, and high vacuum techniques were used where appropriate. Determination of the degree of unsaturation of a poly(1-olefin) was measured either by epoxidation of 1-olefin with m-chloroperbenzoic acid and titration of benzoic acid produced, or reaction of 1-olefin with bromine and measurement of unreacted bromine. Determination of the amount of terminal vinylidene in a polymer sample was carried out using $^{13}C$ and $^1H$ NMR by integration of the peak areas in olefinic regions. Molecular weights were determined using gel permeation chromatography(GPC).

Example 1

A butane-butene feed stock having an approximate composition of 8% propane, 9% propene, 39% isobutane, 14% 1-butene, 12% n-butane, 2% isobutylene 15% cis and trans 2-butenes, 0.5% butadiene and small amounts (less than 1%) of other hydrocarbons) was polymerized using $Ind_2ZrCl_2$ and methylaluminoxane as the catalyst system. A reaction vessel was sequentially charged with 6.7 mg of $Ind_2ZrCl_2$, 25 mL of toluene and 2.0 mL of a solution of MAO in toluene (d=0.860 g/mL, 5.9 wt. % Al, Al/Zr of about 220). The mixture was stirred for about 5 minutes followed by addition of 93 g of the above feed. The reaction mixture was stirred at 40° C. for 20 hr, quenched with isopropanol, extracted into pentane, washed with 2N NaOH and water and dried over $MgSO_4$. Removal of volatile liquids under reduced pressure resulted in recovery of 10.8 g (61% yield based on the propene and 1-butene content) of a clear, viscous material. $^{13}C$ NMR showed major peaks at 109.9–110.1, 112.3–112.5, 145.0–145.3 and 150.5–150.8 ppm. The presence of four peaks indicated chain termination with both propene and butene. A $^1H$ multiplet in the range of 4.6 to 4.8 ppm was also found, and a terminal vinylidene content of greater than 80% was calculated for the product. Using similar feed stocks and the $Ind_2ZrCl_2$ and methylaluminoxane catalyst system, polymers with $M_n$ in a range from about 500 to about 5000 are obtained under controlled temperatures of polymerization in a temperature range of from about −10° C. to about 100° C. Using $Cp_2ZrCl_2$ and methylaluminoxane catalyst system, polymers with $M_n$ in a range from about 300 to about 2000 are obtained under controlled temperatures of polymerization in a temperature range of from about −10° C. to about 100° C.

Example 2

Example 1 is repeated using a butane-butene feed stock having an approximate composition 4% propane, 6% propene, 31% isobutane, 14% 1-butene, 12% n-butane, 17% isobutylene, 16% cis and trans 2-butenes, 0.5% butadiene and small (less than 1%) of other hydrocarbons). A clear, viscous material is recovered having a terminal vinylidene content of greater than 80%. Using similar feed stocks and the $Ind_2ZrCl_2$ and methylaluminoxane catalyst system, polymers with $M_n$ in a range from about 500 to about 5000 are obtained under controlled temperatures of polymerization in a temperature range of from about −10° C. to about 100° C. Using $Cp_2ZrCl_2$ and aluminoxane catalyst system, polymers with $M_n$ in a range from about 300 to about 2000 are obtained under controlled temperatures of polymerization in a temperature range of from about −10° C. to about 100° C.

Example 3

Example 1 is repeated using a butane-butene feed stock having an approximate composition 4% isobutane, 28% 1-butene, 10% n-butane, 42% isobutylene, 16% cis and trans 2-butenes, and small amounts (less than 1%) of other hydrocarbons). 137 g of this feed stock was polymerized at 40° C. with a $Ind_2ZrCl_2$ and methylaluminoxane catalyst system. A clear, viscous material, 22 g with $M_n$ of 674, was recovered. $^{13}C$ NMR showed the four peaks indicated chain termination with both propene and butene. A $^1H$ multiplet in the range of 4.6 to 4.8 ppm was also found, and a terminal vinylidene content of greater than 80% was calculated for the product. Using similar feed stocks and the $Ind_2ZrCl_2$ and methylaluminoxane catalyst system, polymers with $M_n$ in a range from about 500 to about 5000 are obtained under controlled temperatures of polymerization in a temperature range of from about −10° C. to about 100° C. Using $Cp_2ZrCl_2$ and aluminoxane catalyst system, polymers with $M_n$ in a range from about 300 to about 2000 are obtained under controlled temperatures of polymerization in a temperature range of from about −10° C. to about 100° C.

Example 4

Example 1 is repeated using a butane-butene feed stock having an approximate composition 8% isobutane, 46% 1-butene, 17% n-butane, 27% cis and trans 2-butenes, and small amount (less than 1%) of other hydrocarbons). A clear, viscous material is recovered having a terminal vinylidene content of greater than 80%. Using similar feed stocks and the $Ind_2ZrCl_2$ and methylaluminoxane catalyst system, polymers with $M_n$ in a range from about 500 to about 5000 are obtained under controlled temperatures of polymerization in a temperature range of from about −10° C. to about 100° C. Using $Cp_2ZrCl_2$ and aluminoxane catalyst system, polymers with $M_n$ in a range from about 300 to about 2000 are obtained under controlled temperatures of polymerization in a temperature range of from about −10° C. to about 100° C.

Example 5

In this example propane-propene feed stocks varying in the relative amount of propane from 0% propane and 100% propene to 70% propane and 30% propene are polymerized in a series of runs. In each run a reaction vessel is sequentially charged with 6.7 mg of $Ind_2ZrCl_2$, 25 mL of toluene and 2.0 mL of a solution of MAO in toluene (d=0.860 g/mL, 5.9 wt. % Al, Al/Zr of about 220). This mixture is stirred for about 5 minutes followed by addition of feed stock at a constant pressure of 40 psig. The reaction mixture is stirred at 23° C. for 20 hr, quenched with isopropanol, extracted into pentane, washed with 2N NaOH and water and dried over $MgSO_4$. A clear, viscous material is recovered having a terminal vinylidene content of greater than 80%. Using similar feed stocks and the $Ind_2ZrCl_2$ and methylaluminoxane catalyst system, polymers with $M_n$ in a range from about 500 to about 5000 are obtained under controlled temperatures of polymerization in a temperature range of from about −10° C. to about 100° C. Using $Cp_2ZrCl_2$ and aluminoxane catalyst system, polymers with $M_n$ in a range from about 300 to about 2000 are obtained under controlled temperatures of polymerization in a temperature range of from about −10° C. to about 100° C.

Example 6

In this example pentane-pentene feed stocks varying in the relative amount of 1-pentene from 5% 1-pentene and 95% pentane to 50% 1-pentene and 50% pentane are polymerized in a series of runs. In each run a reaction vessel is sequentially charged with 6.7 mg of $Ind_2ZrCl_2$, 25 mL of toluene and 2.0 mL of a solution of MAO in toluene (d=0.860 g/mL, 5.9 wt. % Al, Al/Zr of about 220). This mixture is stirred for about 5 minutes followed by addition of feed stock at a constant pressure. The reaction mixture is stirred at 23° C. for 20 hr, quenched with isopropanol, extracted into pentane, washed with 2N NaOH and water and dried over $MgSO_4$. Removal of volatile liquid under reduced pressure results in recovery of a clear, viscous material. $^{13}$C NMR shows major peaks at 112.3–112.5 and 145.0–145.3 ppm, a $^1$H multiplet in the range of 4.6 to 4.8 ppm, and a terminal vinylidene content of greater than 80%. The product has a $M_n$ in a range from about 500 to about 5000 are obtained at controlled temperatures of polymerization temperature in a range from about −10° C. to about 100° C. Using similar feed stocks $Cp_2ZrCl_2$ and aluminoxane catalyst system, polymers with $M_n$ in a range from about 300 to about 2000 are obtained under controlled temperatures of polymerization in a temperature range of from about −10° C. to about 100° C.

Example 7

A 20 mL to 10 mL ratio of 1-hexene and 7-methyl-1,6-octadiene ratio was polymerized in toluene at 50° C. using 4.5 mg of $Ind_2ZrCl_2$ and an aluminoxane to metallocene ratio of 330 to give a clear, free flowing viscous polymer which exhibits a $M_n$ of 1170 and a DI(dispersivity index) of 1.51 using GPC. $^{13}$C NMR analysis shows two types of olefinic linkages, terminal vinylidene and side chain. Analysis shows that about one molecule of diene per two hexene molecules has been incorporated in the chain.

Preparative Example 1

A reaction vessel was sequentially charged with 6.7 mg of $Ind_2ZrCl_2$, 25 mL of toluene and 2.0 mL of a solution of MAO in toluene (d=0.860 g/mL, 5.9 wt. % Al, Al/Zr of about 220). This mixture was stirred for about 5 minutes followed by addition of propylene at a constant pressure of 40 psig. The reaction mixture was stirred at 23° C. for 20 hr, quenched with isopropanol, extracted into pentane, washed with 2N NaOH and water and dried over $MgSO_4$. Removal of volatile liquid under reduced pressure resulted in recovery of 135 g of a clear, viscous material. $^{13}$C NMR showed major peaks at 112.3–112.5 and 145.0–145.3 ppm, a $^1$H multiplet in the range of 4.6 to 4.8 ppm, and a terminal vinylidene content of greater than 90% was calculated. This product, identified as poly(1-propylene) PEx-1, had a $M_n$ of 2325 and a $M_w/M_n$ of 1.73.

Preparative Example 2

The polymerization of Example 1 was repeated, except the temperature of polymerization was 53° C. A polymer, identified as poly(1-propylene) PEx-2, with $M_n$ of 987 and a $M_w/M_n$ of 1.70 was recovered.

Preparative Example 3

A reaction vessel was sequentially charged with 8.1 mg of $Cp_2ZrCl_2$, 50 mL of toluene and 2.2 mL of a solution of MAO in toluene (d=0.860 g/mL, 5.9 wt. % Al, Al/Zr of about 150). The mixture was stirred for about 5 minutes followed by addition of propylene at 40 psig for 1 hr. The reaction mixture was stirred at 50° C. for 1 hr, quenched with isopropanol, extracted into pentane, washed with 2N NaOH and water and dried over $MgSO_4$. Removal of the liquid under reduced pressure resulted in recovery of 15.0 g of a clear, viscous material. $^{13}$C NMR showed major peaks at 112.3–112.5 and 145.0–145.3 ppm a $^1$H multiplet at 4.6–4.8 ppm and the polymer exhibits a terminal vinylidene content of 90%. This product, identified as poly(1-propylene) PEx-3, has a $M_n$ of 477 and a $M_w/M_n$ of 2.18.

Preparative Example 4

A reaction vessel was sequentially charged with 6.7 mg of $Ind_2ZrCl_2$, 25 mL of toluene and 2.0 mL of a solution of MAO in toluene (d=0.868 g/mL, 5.9 wt. % Al, Al/Zr of about 220). The mixture was stirred for about 5 minutes followed by addition of 200 g of 1-butene. The reaction mixture was stirred at 40° C. for 20 hours, quenched with isopropanol, extracted into pentane, washed with 2N NaOH and water and dried over $MgSO_4$. Removal of the liquid under reduced pressure resulted in recovery of 190 g (95% yield) of a clear, viscous material. $^{13}$C NMR showed major peaks at 108–112 and 149–152 ppm and a $^1$H multiplet at 4.6–4.8 ppm. Analysis showed the terminal vinylidene content to be greater than 80%. This, identified as poly(1-butene) PEx-4, product has a $M_n$ of 1860 and a $M_w/M_n$ of 1.64. It is possible to obtain polymers with an $M_n$ ranging from about 500 to 5000 with the catalyst by varying the polymerization temperature from −10° C. to 100° C.

Preparative Example 5

A reaction vessel was sequentially charged with 5.0 mg of $Cp_2ZrCl_2$, 25 mL of toluene and 2.0 mL of a solution of MAO in toluene (d=0.860 g/mL, 5.9 wt. % Al, Al/Zr of about 220). The mixture was stirred for about 5 minutes followed by addition of 200 g of 1-butene. The reaction mixture was stirred at 40° C. for 20 hr, quenched with isopropanol, extracted into pentane, washed with 2N NaOH and water and dried over $MgSO_4$. Removal of the liquid under reduced pressure resulted in recovery of 160 g (80% yield) of a clear, viscous material. $^{13}$C NMR showed major peaks at 108–112 and 149–152 ppm and a 1H multiplet in the range of 4.6 to 4.8 ppm. The terminal vinylidene content of the product was greater than 80%. This product, identified as poly(1-butene) PEx-5, had a $M_n$ of 661 and a $M_w/M_n$ of 1.92. It is possible to obtain polymers with an $M_n$ ranging from about 300 to 2000 with the catalyst by varying the polymerization temperature from −10° C. to 100° C.

Preparative Example 6

A reaction vessel was sequentially charged with 6.7 mg of $Ind_2ZrCl_2$, 25 mL of toluene and 2.0 mL of a solution of MAO in toluene (d=0.860 g/mL, 5.9 wt. % Al, Al/Zr of about 220). The mixture was stirred for about 5 minutes followed by addition of 200 g of 1-hexene. The reaction mixture was stirred at 40° C. for 20 hr, quenched with isopropanol, extracted into pentane, washed with 2N NaOH and water and dried over $MgSO_4$. Removal of the liquid under reduced pressure resulted in recovery of 190 g (95% yield) of a clear, viscous material. $^{13}C$ NMR showed major peaks at 108–112 and 149–152 ppm, a $^1H$ multiplet in the range of 4.6–4.8 ppm and a terminal vinylidene content of greater than 80%. This product, identified as poly(1-hexene) PEx-6, had a $M_n$ of 2653 and a $M_w/M_n$ of 2.19. It is possible to obtain polymers with an $M_n$ ranging from about 500 to 5000 with the catalyst by varying the polymerization temperature from −10° C. to 100° C.

Preparative Example 7

A 20 mL to 10 mL ratio of 1-hexene and 7-methyl-1,6-octadiene ratio was polymerized in toluene at 50° C. using 4.5 mg of $Ind_2ZrCl_2$ and an aluminoxane to metallocene ratio of 330 to give a clear, free flowing viscous polymer which exhibits a $M_n$ of 1170 and a DI (dispersivity index) of 1.51 using GPC. $^{13}C$ NMR analysis shows two types of olefinic linkages, terminal vinylidene and side chain. Analysis shows that about one molecule of diene per two hexene molecules has been incorporated in the chain.

Preparative Example 8

In this example five selected metallocene catalysts systems were used under similar conditions. In each run a reaction vessel was sequentially charged with 5 mg of metallocene, 25 mL of toluene and 2.0 mL of a solution of MAO in toluene (d=0.860 g/mL, 5.9 wt. % Al, Al/Zr of about 220). The mixture was stirred for about 5 minutes followed by addition of 180 g of 1-butene. The reaction mixture was stirred at 40° C. for 20 hr, quenched with isopropanol, extracted into pentane, washed with 2N NaOH and water and dried over $MgSO_4$. Removal of the liquid under reduced pressure resulted in recovery of a clear, viscous material. $^{13}C$ NMR showed major peaks at 108–112 and 149–152 ppm, a $^1H$ multiplet in the range of 4.6–4.8 ppm and a terminal vinylidene content of greater than 80% for each product. The metallocenes used and $M_n$ of each product obtained are listed below.

| Table of Preparative Example 8 | |
|---|---|
| Metallocene | $M_n$ |
| $Cp_2ZrCl_2$ | 566 |
| $(MeCp)_2ZrCl_2$ | 600 |
| $(BuCp)_2ZrCl_2$ | 565 |
| $(Me_5Cp)_2ZrCl_2$ | 1513 |
| $Ind_2ZrCl_2$ | 1755 |

Example 8

A 9 g portion of a poly(1-propene) made in the manner of Preparative Example 2 (VPO MW 987) was placed in a Monel container along with 0.0145 g of platinum divinyltetramethyldisiloxane catalyst and 2.02 g of methyldichlorosilane. The container was sealed and heated to 80° C. for 3 hr. Upon cooling the product was transferred into a round-bottom flask and the excess silane removed by vacuum stripping. The final product showed a conversion of 83.5% as determined by comparison of the residual olefin content with the starting polymer. This conversion was also confirmed by determination of the amount of silane reacted. Similar results were obtained by employing $H_2PtCl_6$ as the catalyst.

Example 9

A 9 g portion of poly(1-butene) made in the manner of Preparative Example 5 (GPC $M_n$ 760) was placed in a Monel container along with 0.013 g of platinum divinyltetramethyldisiloxane catalyst and 1.8 g of methyldichlorosilane. The container was sealed and heated to 80° C. for 3 hr. Upon cooling the product was transferred into a round-bottom flask and the excess silane removed by vacuum stripping. The final product showed a conversion of 81% as determined by comparison of the residual olefin content with the starting polymer. This conversion was also confirmed by determination of the amount of silane reacted. Similar results were obtained by employing $H_2PtCl_6$ as the catalyst.

Comparative Example 9

This Example was run similarly to Examples 8 and 9 except that a 10 g portion of Amoco polybutene of grade H-100, 0.0145 g of platinum divinyltetramethyldisiloxane and 2 g of methyldichlorosilane were used. The conversion was 5.3%.

Example 10

The epoxidation of a 10 g portion poly(1-butene) made in the manner of Preparative Example 4 was carried out in 100 mL of chloroform to which was added 1.1 equivalents of m-chloroperbenzoic acid. The peracid was about 75% pure. The solution was refluxed for one hour and worked up by pouring it onto cracked ice in water and extracting the product into chloroform. The chloroform layer was subsequently extracted with a 10% sodium bicarbonate solution to remove acid. NMR analysis of the product after removal of the chloroform by rotary evaporation showed no remaining olefin and essentially 100% conversion to the epoxide.

Example 11

To a 2 liter autoclave was charged 500 g of a poly(1-butene) made in the manner of Preparative Example 4 with a molecular weight of 1922 made in the manner of Example 2. To this was added a 28 g portion (1.1 molar excess) of maleic anhydride. The autoclave was sealed and heated to a temperature of approximately 220° C. and held for a specified period of time. The autoclave was then cooled and the resulting product removed and analyzed for its conversion to the succinic anhydride derivative. Under these conditions a conversion of about 61% was obtained. Under the same reaction conditions a conventional polybutene sample of similar molecular weight gave a conversion of about 42%.

Example 12

A 300 mL stainless steel autoclave was charged with a 30 g portion of poly-(1-butene) made in the manner of Preparative Example 5 with a $M_n$ of 489, 115 mL of hexene and a 1.0 g portion of dicobalt octacarbonyl. The autoclave was sealed and purged of oxygen by pressurizing the reactor to 90 psig with a 2/1 $H_2/CO$ gas mixture, stirring for few moments and then slowly venting the pressure. This procedure was repeated twice. The pressure was adjusted to 2500 psig and the solution heated to 180° C. After reaching reaction temperature, the pressure was readjusted to 3000 psig and the solution allowed to stir for 3 hr under these conditions. After this time, the solution was cooled to room temperature and slowly vented to atmospheric pressure. The crude dark red-brown solution was washed with refluxing 10% acetic acid until the organic layer was colorless. The layers were separated and the organic layer washed with water and dried over $MgSO_4$. Analysis was performed using silica gel chromatography employing first pentane and then chloroform/acetone as solvents. Conversion of poly(1-butene) to poly(1-butylalcohol) and poly(1-butylformate) was 87%.

Example 13

The procedure employed in Example 12 was followed using poly-(1-butene) made in the manner of Preparative Example 4 with a $M_n$ 1098. Conversion to poly-butylalcohol and poly-1-butylformate (as determined by silica gel chromatography) was 84%.

Example 14

A portion of a poly-(1-propene) made in the manner of Preparative Example 2 ($M_n$ about 900) was chlorinated at 0.1 SCFH chlorine at temperatures above 100° C. The resulting polypropyl chloride contained 8.2% chloride. This chlorinated viscous polymer was reacted with an excess of aliphatic diamine for several hours at reflux. The resulting aminated polypropene had a basic nitrogen content of 1.75 wt % which is suitable for a variety of uses including detergents and other fuel additives.

What is claimed is:

1. A viscous terminally unsaturated copoly(1-olefin) formed from two or more $C_3$–$C_{20}$ linear 1-olefins and having a molecular weight of about 300 to about 10,000 and a terminal vinylidene content of more than 80%.

2. The viscous terminally unsaturated copoly(1-olefin) of claim 1 having a terminal vinylidene content of at least about 90% and a molecular weight of about 300 to about 5000.

3. The viscous terminally unsaturated copoly(1-olefin) of claim 1 having a terminal vinylidene content of at least about 95% and a molecular weight of about 400 to about 3000.

4. The viscous terminally unsaturated copoly(1-olefin) of claim 1 formed from a mixture of propylene and 1-butene.

5. The viscous terminally unsaturated copoly(1-olefin) of claim 1 formed from propylene and at least one $C_4$–$C_{20}$ linear 1-olefin.

6. The viscous terminally unsaturated copoly(1-olefin) of claim 1 formed from 1-butene and at least one $C_5$–$C_{20}$ linear 1-olefin.

7. The viscous terminally unsaturated copoly(1-olefin) of claim 1 formed from propylene and a $C_4$–$C_{10}$ linear 1-olefin.

8. The viscous terminally unsaturated copoly(1-olefin) of claim 1 formed from propylene and a $C_4$–$C_6$ linear 1-olefin.

9. The viscous terminally unsaturated copoly(1-olefin) of claim 1 formed from 1-butene and a $C_5$–$C_{10}$ linear 1-olefin.

10. The viscous terminally unsaturated copoly(1-olefin) of claim 1 formed from 1-butene and a $C_5$–$C_6$ linear 1-olefin.

11. The viscous terminally unsaturated copoly(1-olefin) of claim 1 having a terminal vinylidene content of more than 90%.

12. The viscous terminally unsaturated copoly(1-olefin) of claim 1 having a terminal vinylidene content of more than 95%.

13. The viscous terminally unsaturated copoly(1-olefin) of claim 1 having a terminal (1-olefin) content of more than 98%.

14. The viscous terminally unsaturated copoly(1-olefin) of claim 1 having a terminal (1-olefin) content of more than 99%.

15. The viscous terminally unsaturated copoly(1-olefin) of claim 1 having a molecular weight of about 300 to about 5000.

16. The viscous terminally unsaturated copoly(1-olefin) of claim 1 having a molecular weight of about 400 to about 3000.

17. The viscous terminally unsaturated copoly(1-olefin) of claim 1 having a molecular weight of about 1000 to about 2000.

18. The viscous terminally unsaturated copoly(1-olefin) of claim 15 formed from a mixture of propylene and 1-butene.

19. The viscous terminally unsaturated copoly(1-olefin) of claim 15 formed from propylene and at least one $C_4$–$C_{20}$ linear 1-olefin.

20. The viscous terminally unsaturated copoly(1-olefin) of claim 15 formed from propylene and at least one $C4$–$C_{10}$ linear 1-olefin.

21. The viscous terminally unsaturated copoly(1-olefin) of claim 15 formed from propylene and at least one $C_4$–$C_{20}$ linear 1-olefin and having a terminal vinylidene content of more than 90%.

22. The viscous terminally unsaturated copoly(1-olefin) of claim 15 formed from propylene and at least one $C_4$–$C_{20}$ linear 1-olefin and having a terminal vinylidene content of more than 95%.

23. The viscous terminally unsaturated copoly(1-olefin) of claim 15 formed from propylene and at least one $C_4$–$C_{20}$ linear 1-olefin and having a terminal (1-olefin) content of more than 98%.

24. The viscous terminally unsaturated copoly(1-olefin) of claim 15 formed from propylene and at least one $C_4$–$C_{20}$ linear 1-olefin and having a terminal (1-olefin) content of more than 99%.

25. The viscous terminally unsaturated copoly(1-olefin) of claim 15 formed from 1-butene and at least one $C_5$–$C_{20}$ linear 1-olefin.

26. The viscous terminally unsaturated poly(1-olefin) of claim 15 formed from 1-butene and at least one $C_5$–$C_{10}$ linear 1-olefin.

27. The viscous terminally unsaturated poly(1-olefin) of claim 15 formed from 1-butene and at least one $C_5$–$C_{20}$ linear 1-olefin and having a terminal vinylidene content of more than 90%.

28. The viscous terminally unsaturated copoly(1-olefin) of claim 15 formed from 1-butene and at least one $C_5$–$C_{20}$ linear 1-olefin and having a terminal vinylidene content of more than 95%.

29. The viscous terminally unsaturated copoly(1-olefin) of claim 15 formed from 1-butene and at least one $C_5$–$C_{20}$ linear 1-olefin and having a terminal (1-olefin) content of more than 98%.

30. The viscous terminally unsaturated copoly(1-olefin) of claim 15 formed from 1-butene and at least one $C_5$–$C_{20}$ linear 1-olefin and having a terminal (1-olefin) content of more than 99%.

* * * * *

UNITED STATES PATENT AND TRADEMARK OFFICE
CERTIFICATE OF CORRECTION

PATENT NO. : 6,043,401
DATED : March 28, 2000
INVENTOR(S) : Vahid Bagheri, Bruce Firth, Frank Calabrese, Robert Scott Hensey It is certified that error appears in the above-identified patent and that said Letters Patent is hereby corrected as shown below:

Column 1,
Line 38, "propylene, butene1," should read: -- propylene, butene-1, --

Column 4,
Lines 44, 45, "invention is process to sequentially from" should read: -- invention is a process to sequentially form --

Column 5,
Lines 10, 11, "cyclic methylalumninoxane" should read: -- cyclic methylaluminoxane --

Column 6,
Line 24, "zirconium (V)" should read: -- zirconium (IV) --

Column 8,
Line 22, "as maybe understood" should read: -- as may be understood --
Lines 50, 51, "these volatile hydrocarbon liquid" should read: -- these volatile hydrocarbon liquids --

Column 9,
Line 3, "from abeam cracking" should read: -- from steam cracking --
Line 16, "other hydrocarbons). Other" should read: -- other hydrocarbons. Other --
Line 20, "other hydrocarbons) and" should read: -- other hydrocarbons and --
Line 24, "other hydrocarbons)." should read: -- other hydrocarbons. --

Column 10,
Line 43, "such as a alkoxysilane" should read: -- such as an alkoxysilane --
Lines 46, 47, "hydrohalogenation hydrogenation" should read: -- hydrohalogenation, hydrogenation --
Lines 49, 50, "1-olefins do may be understood" should read: -- 1-olefins do as may be understood --
Line 64, "terminal olefin; and." should read: -- terminal olefin; and --

Column 11,
Line 44, "isobutylene 15% cis" should read: -- isobutylene, 15% cis --
Line 46, "other hydrocarbons) was" should read: -- other hydrocarbons were --

Column 12,
Line 51, "of other hydrocarbons)." should read: -- of other hydrocarbons. --

UNITED STATES PATENT AND TRADEMARK OFFICE
CERTIFICATE OF CORRECTION

PATENT NO.   : 6,043,401
DATED        : March 28, 2000
INVENTOR(S)  : Vahid Bagheri, Bruce Firth, Frank Calabrese, Robert Scott Hensey It is certified that error appears in the above-identified patent and that said Letters Patent is hereby corrected as shown below:

Column 16,
Line 20, "excess silane removed" should read: -- excess silane was removed --
Line 57, "resulting product removed" should read: -- resulting product was removed --
Line 66, "115 mL of hexene" should read: -- 115 mL of hexane --

Column 17,
Lines 2,3 "stirring for few moments" should read: -- stirring for a few moments --
Line 7, "solution allowed to stir" should read: -- solution was allowed to stir --

Signed and Sealed this

Eleventh Day of September, 2001

*Attest:*

*Attesting Officer*

NICHOLAS P. GODICI
*Acting Director of the United States Patent and Trademark Office*